United States Patent
Maddah-Ali et al.

(10) Patent No.: US 9,445,285 B2
(45) Date of Patent: Sep. 13, 2016

(54) INTERFERENCE ALIGNMENT FOR TRANSMITTER/RECEIVER PAIRS IN WIRELESS COMMUNICATION SYSTEMS

(71) Applicant: ALCATEL-LUCENT USA INC., Murray Hill, NJ (US)

(72) Inventors: Mohammadali Maddah-Ali, East Brunswick, NJ (US); Vasileios Ntranos, Los Angeles, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 284 days.

(21) Appl. No.: 14/054,654

(22) Filed: Oct. 15, 2013

(65) Prior Publication Data
US 2015/0103753 A1    Apr. 16, 2015

(51) Int. Cl.
| H04J 11/00 | (2006.01) |
| H04W 24/02 | (2009.01) |
| H04B 7/06 | (2006.01) |
| H04L 5/00 | (2006.01) |
| H04L 1/00 | (2006.01) |

(52) U.S. Cl.
CPC .......... *H04W 24/02* (2013.01); *H04B 7/0617* (2013.01); *H04J 11/0046* (2013.01); *H04J 11/0059* (2013.01); *H04L 1/0045* (2013.01); *H04L 5/0073* (2013.01)

(58) Field of Classification Search
None
See application file for complete search history.

(56) References Cited

U.S. PATENT DOCUMENTS

| 6,360,107 | B1 | 3/2002 | Lin et al. | |
| 2010/0069010 | A1* | 3/2010 | Karakayali | H04B 7/024 455/63.1 |
| 2012/0093093 | A1* | 4/2012 | Frenger | H04B 7/0452 370/329 |
| 2012/0122472 | A1* | 5/2012 | Krishnamurthy | H04L 5/0053 455/456.1 |
| 2013/0170533 | A1* | 7/2013 | Khojastepour | H04B 7/024 375/227 |
| 2013/0203428 | A1* | 8/2013 | Hwang | H04W 72/082 455/450 |

FOREIGN PATENT DOCUMENTS

| EP | 2141945 A2 | 1/2010 |
| WO | 9728666 A1 | 8/1997 |

OTHER PUBLICATIONS

International Search Report and Written Opinion corresponding to PCT/US2014/058611, mailed Feb. 2, 2015, 12 pages.
"Inter-cell Interference Management and Network MIMO", 3GPP TSG RAN WG1 Meeting #53, Jun. 30-Jul. 4, 2008, 4 pages.

* cited by examiner

*Primary Examiner* — Mohammad Adhami
(74) *Attorney, Agent, or Firm* — Davidson Sheehan LLP

(57) ABSTRACT

Interference is mitigated in a wireless communication system using interference alignment techniques to cancel inter-cell interference based on a decoding order while using joint decoding to cancel intra-cell interference. Second transmitter-receiver pairs proximate a first transmitter-receiver pair may be selected so that the first transmitter-receiver pair is in a first cell and the second transmitter-receiver pairs are not in the first cell. Signals transmitted by the second transmitter-receiver pairs may be aligned to be received by the first transmitter-receiver pair in a first subspace of channels. A second subspace of the channels is free of the signals transmitted by the second transmitter-receiver pairs.

18 Claims, 8 Drawing Sheets

INTERFERENCE ALIGNMENT FOR TRANSMITTER/RECEIVER PAIRS IN WIRELESS COMMUNICATION SYSTEMS

BACKGROUND

1. Field of the Disclosure

The present disclosure relates generally to wireless communication systems and, in particular, to mitigating interference in wireless communication systems.

2. Description of the Related Art

A wireless communication system can be represented as an ensemble of transmitter-receiver pairs. For example, a transmitter-receiver pair for uplink transmission between an access terminal and a base station includes the transmitter in the access terminal and the receiver in the base station. For another example, a transmitter-receiver pair for downlink transmission between the base station and the access terminal includes the transmitter in the base station and the receiver in the access terminal. Transmitters and receivers may include multiple antennas that are able to transmit signals over multiple channels between the transmitter and the receiver. Systems that use multiple antennas may be referred to as multiple-in-multiple-out (MIMO) systems. Interference between the transmitter-receiver pairs is the dominant limiting factor in the performance of wireless communication systems.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Interference alignment can reduce interference created at a transmitter-receiver pair by aligning signals transmitted by neighboring transmitter-receiver pairs. For example, to align potentially interfering signals received by a transmitter-receiver pair, the signals transmitted by neighboring transmitter-receiver pairs are precoded so that the transmitter-receiver pair receives signals from the neighboring transmitter-receiver pairs in a first subspace of the channels available to the transmitter-receiver pair. A second subspace of the channels remains free of signals transmitted by the neighboring transmitter-receiver pairs and consequently the transmitter-receiver pair can use the second subspace of the channels for interference-free transmission. However, no self-consistent solution has been found that aligns the signals transmitted by all the transmitter-receiver pairs in an actual wireless communication system with feasible delay and channel accuracy.

A practical approach to reducing interference at a transmitter-receiver pair in a wireless communication system includes selecting a subset of neighboring transmitter-receiver pairs that do not share the same cell as the transmitter-receiver pair and performing interference alignment on the selected subset receivers' terminals. In some embodiments, interference between a first transmitter-receiver pair and one or more second transmitter-receiver pairs in the wireless communication system may be reduced using a three-step cancellation procedure. First, decoded signals from the first transmitter-receiver pair are provided to the second transmitter-receiver pairs to cancel interference caused by the first transmitter-receiver pair. For example, the transmitter-receiver pairs in the wireless communication system can be ordered and each transmitter-receiver pair can provide decoded signals from its corresponding receiver to neighboring higher-order transmitter-receiver pairs, which can use the decoded signals to cancel interference. Second, signals transmitted by a subset of the second transmitter-receiver pairs that are outside the cell that includes the first transmitter-receiver pair are aligned. For example, aligning signals transmitted by a group of neighbor transmitter-receiver pairs based on channel matrices between the transmitter-receiver pairs can reduce or eliminate remaining inter-cell interference at each transmitter-receiver pair. Transmissions by adjacent groups can be coordinated based on signals transmitted by a transmitter-receiver pair that is a member of the adjacent groups. Third, signals received by the first transmitter-receiver pair and a subset of the second transmitter-receiver pairs that are inside the cell may be jointly decoded. In this step, the aligned interference from other cells is treated as noise, and/or null out, for example using zero-forcing or minimum mean square error (MMSE) filters.

Figure 1:
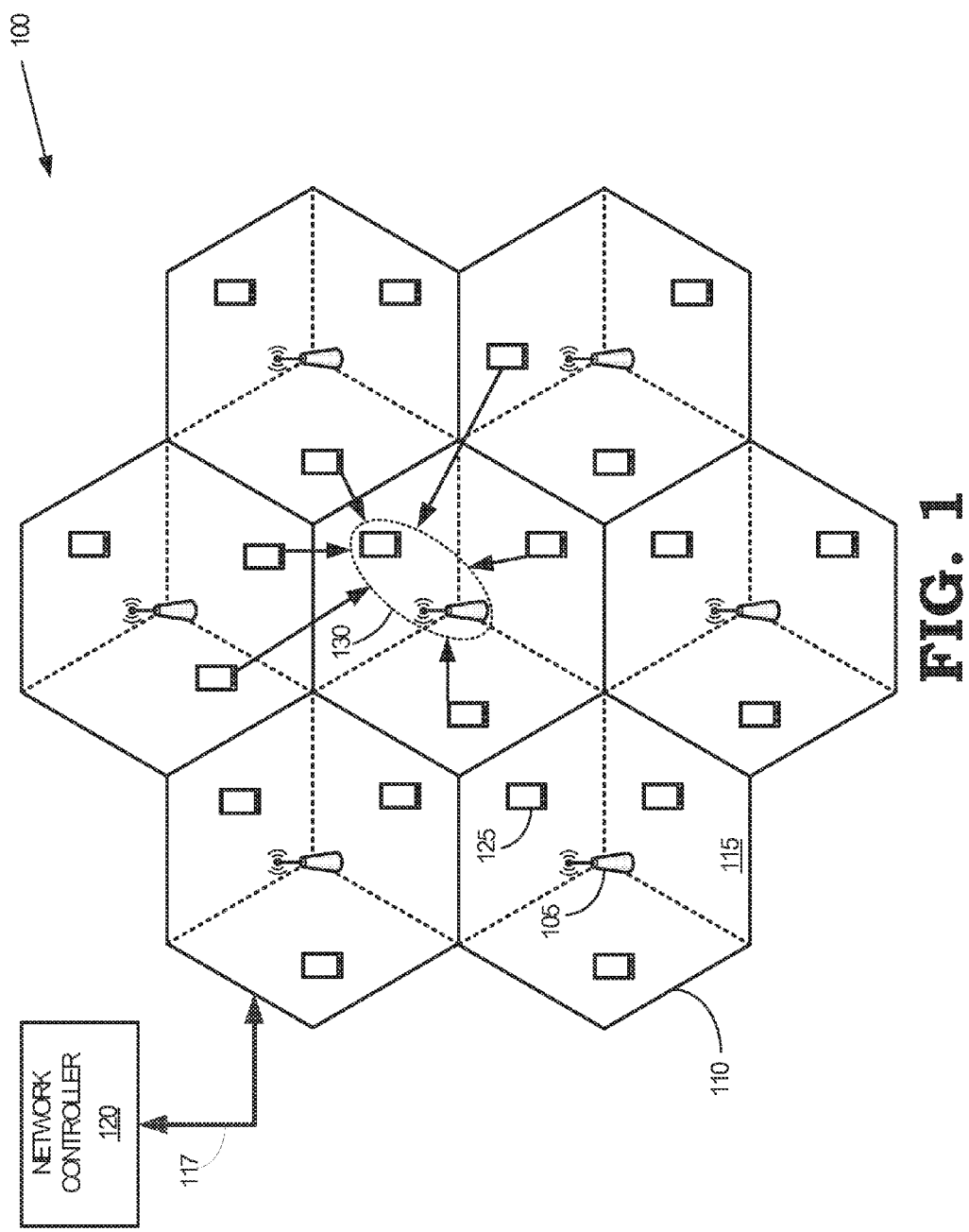
FIG. 1 illustrates an example of a wireless communication system according to some embodiments.

FIG. 1 illustrates an example of a wireless communication system 100 according to some embodiments. The wireless communication system 100 includes a network of base stations 105 (only one indicated by a reference numeral in the interest of clarity) for providing wireless connectivity into a corresponding geographic area or cell 110 (only one indicated by a reference numeral in the interest of clarity). In some embodiments, the base station 105 can provide independent wireless connectivity in portions of the cells 110 that are referred to as sectors 115 (only one indicated by a reference numeral in the interest of clarity). For example, each base station 105 in FIG. 1 can provide wireless connectivity to three sectors 115, e.g., using an antenna array (not shown) implemented in or connected to the base station 105. The base stations 105 may be interconnected by wired or wireless backhaul connections in a backhaul network that is schematically indicated by the double arrow 117. Information can be exchanged between the base stations 105 using the backhaul network 117. In some embodiments, the base stations 105 may also be connected to a network controller 120 by the backhaul network 117 so that information can be exchanged between the base stations 105 and the network controller 120.

The network of base stations 105 may provide wireless connectivity to one or more user equipment 125 (only one indicated by a reference numeral in the interest of clarity), e.g., for supporting downlink (or forward link) communication from the base station 105 to the user equipment 125 and uplink (or reverse link) communication from the user equipment 125 to the base station 105. Each combination of a base station 105 and one user equipment 125 may be considered a transmitter receiver pair, as indicated by the dotted oval 130. Although not shown by a separate dotted oval, each user equipment 125 may be considered part of a transmitter receiver pair that includes the corresponding base station 105 in the cell 110 that includes the user equipment 125.

The quality of communications between the base station 105 and the user equipment 125 in the transmitter receiver pair 130 may be degraded by interference from neighboring transmitter receiver pairs. Path loss and shadowing effects may be taken into account to distinguish between strong and weak interferers. For example, some neighboring user equipment 125 may be relatively strong interferers and uplink transmissions from the neighboring user equipment 125 to the base station 105 in its transmitter receiver pair may interfere with transmissions between the base station 105 and the user equipment 125 in the transmitter receiver pair 130, as indicated by the arrows in FIG. 1. Intra-cell interference may be generated by user equipment 125 within the same cell as the transmitter receiver pair 130 and inter-cell interference may be generated by user equipment 125 within neighboring cells. For another example, downlink transmissions from base stations 105 to the neighboring user equipment 125 may also interfere with transmissions within the transmitter receiver pair 130. Interference caused by downlink transmissions may also be categorized as intra-cell interference or inter-cell interference.

Interference at the transmitter receiver pair 130 may be mitigated, reduced, or canceled using interference alignment for user equipment 125 that are outside the cell that includes the transmitter receiver pair 130. Some embodiments of the wireless communication system 100 may select a subset of transmitter-receiver pairs that are proximate the transmitter receiver pair 130 (or are otherwise identified as strong interferers) but are outside of the cell 110 that includes the transmitter receiver pair 130. Signals transmitted by the selected subset of transmitter receiver pairs may be aligned so that they are received by the first transmitter-receiver pair in a first subspace of channels, as discussed in detail below. Aligning the signals into the first subspace of channels leaves a second subspace of the channels free of interference so that the transmitter receiver pair 130 can transmit signals interference free, as discussed in detail below. Interference alignment may be performed in a centralized manner by the network controller 120 using information exchanged over the backhaul network 117 or in a distributed manner by the base stations 105 using information exchanged over the backhaul network 117 or through iterative approaches which include estimation of interference-covariance and design of transmission direction. Some embodiments of the base stations 105 may be able to jointly process signals received from user equipment 125 in their corresponding cells 110 to further mitigate interference, as discussed in detail below.

Figure 2:
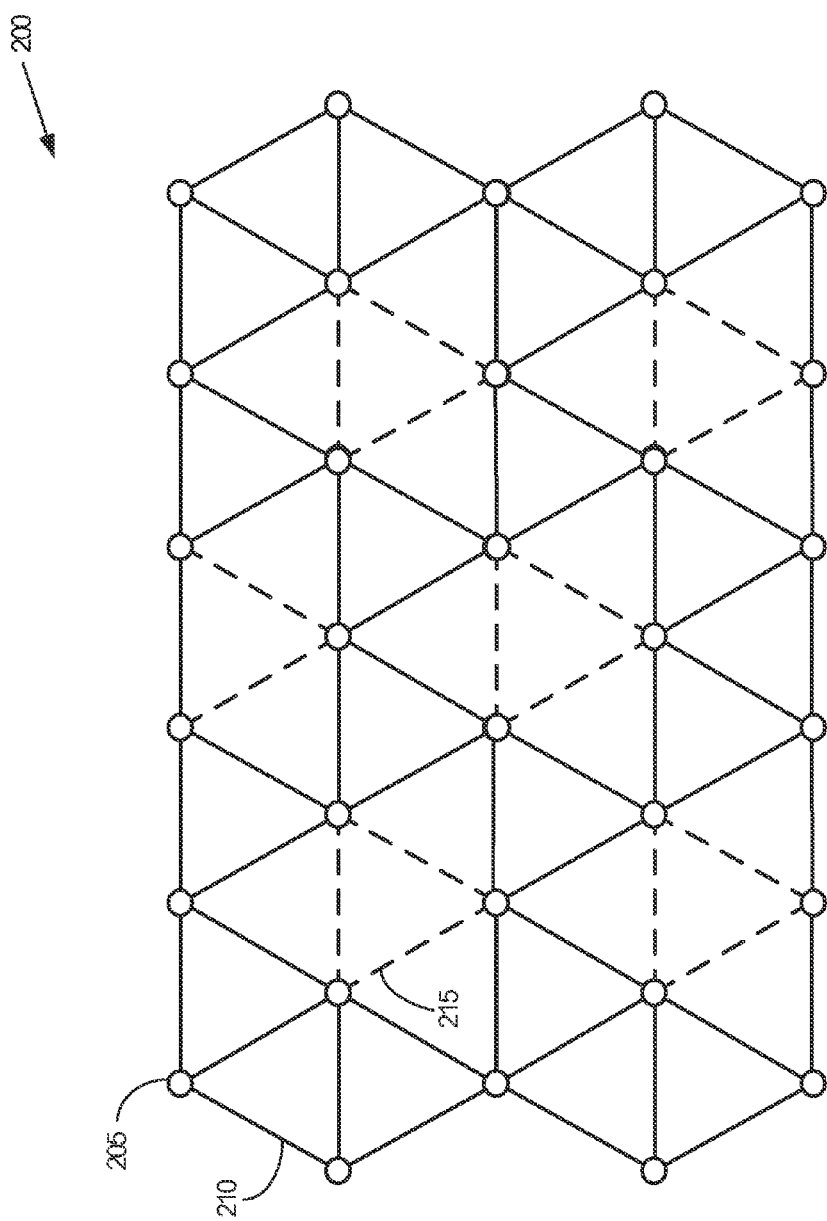
FIG. 2 is an interference graph that shows nodes that represent each transmitter receiver pair in a network and edges that represent some of the dominant mutual interference between the nodes according to some embodiments.

FIG. 2 is an interference graph 200 that shows nodes 205 that represent each transmitter receiver pair in a network and edges 210, 215 that represent mutual interference between the nodes 205 according to some embodiments. The solid line edges 210 indicate inter-cell interference between nodes 205 that are associated with different cells and the dashed line edges 215 indicate intra-cell interference between nodes 205 that are associated with the same cell. The interference indicated by the edges 210, 215 goes in two directions, e.g., a first node 205 generates transmissions that interfere with a second node 205 and the second node 205 generates transmissions that interfere with the first node 205. Each node 205 in the interference graph 200 is connected to four inter-cell edges 210 and two intra-cell edges 215. The interference graph 200 may therefore correspond to embodiments of the wireless communication system 100, where the dominant interference from nearby transmitter-receiver pairs are depicted. For example, a node 205 may correspond to the transmitter receiver pair 130 shown in FIG. 1, which receives intra-cell interference from two user equipment 125 and inter-cell interference from four user equipment 125. However, some embodiments of interference graphs 200 may include nodes 205 that are linked by different numbers of inter-cell edges 210 or intra-cell edges 215.

Network interference cancellation and interference alignment may be used to support reuse-one cellular communication (i.e., all cells can concurrently use the same frequency or set of frequencies for communication) in a wireless communication system represented by the interference graph 200 without being limited by the interference contribution from neighboring cells or sectors. Embodiments of the techniques described herein may be scalable so that the overall performance can scale to larger cellular networks that include larger numbers of transmitter receiver pairs or nodes 205. Embodiments may also be local to exploit the distributed nature of the cellular network and operate under local information exchange, e.g., exchange of channel state information, channel matrices, limited cooperation, and the like. Network interference cancellation and interference alignment may also achieve high spectral efficiency by allowing more parallel or concurrent transmissions in the same spectrum or bandwidth.

Figure 3:
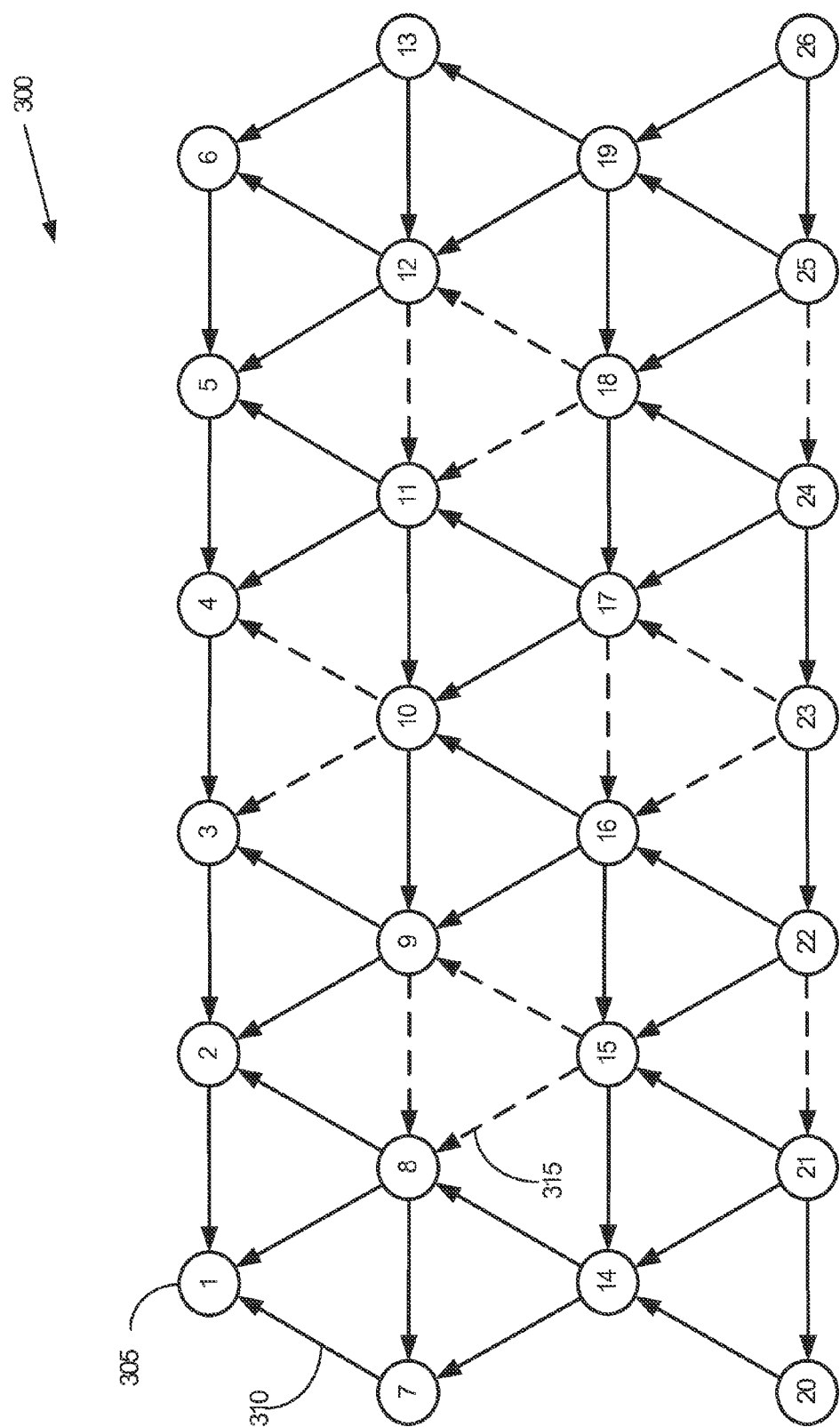
FIG. 3 is an interference graph that shows directed interference between an ordered set of nodes after network interference cancellation according to some embodiments.

FIG. 3 is an interference graph 300 that shows directed interference between an ordered set of nodes 305 after network interference cancellation according to some embodiments. As discussed herein, interference between the nodes 305 is bi-directional and therefore travels in both directions between pairs of nodes 305. However, neighboring base stations, such as the base stations 105 shown in FIG. 1, may exchange decoded messages over the backhaul network. The decoded messages are generated by decoding messages in signals received from user equipment such as the user equipment 125 shown in FIG. 1. The neighboring base stations may then use the received decoded message to cancel interference caused by the signal including the decoded messages.

A portion of the interference indicated by the edges 310, 315 may be canceled by subtracting interference associated with the exchanged decoded messages, thereby eliminating interference in one direction so that the interference indicated by the edges 310, 315 is one directional, as indicated by the arrows. In some embodiments, decoded messages may be exchanged according to a decoding order that is defined for the nodes 305. For example, the decoding order of the nodes 305 is indicated by the numerals shown in FIG. 3. Decoded messages may be passed from nodes 305 that have lower values of the numerals to nodes 305 that have higher values of the numerals. For example, messages decoded by the node 305 assigned 1 are passed to the nodes 305 assigned 2, 7, 8 so that they can cancel interference associated with the decoded messages. After canceling the interference from the decoded messages, the edges 310 are one directional and point towards the node 305 assigned 1 because interference in the other direction (towards the nodes 305 assigned 2, 7, 8) has been canceled using the decoded messages from the node 305 assigned 1.

In some embodiments, each transmitter and receiver in a transmitter receiver pair associated with a node 305 may include M=2 antennas for transmission and reception of signals over the air interface. Each transmitter receiver pair therefore supports four channels over the air interface. After network interference cancellation, each node 305 observes three interfering streams (incoming edges 310) and one desired stream between the transmitter and receiver in the node 305. The streams are observed in a two-dimensional space defined by the M=2 receive antennas and consequently the network remains interference limited. Although the example discussed above assumes M=2 antennas for each transmitter and receiver, this analysis also applies to embodiments in which the transmitters and receivers may include different numbers of antennas.

Figure 4:
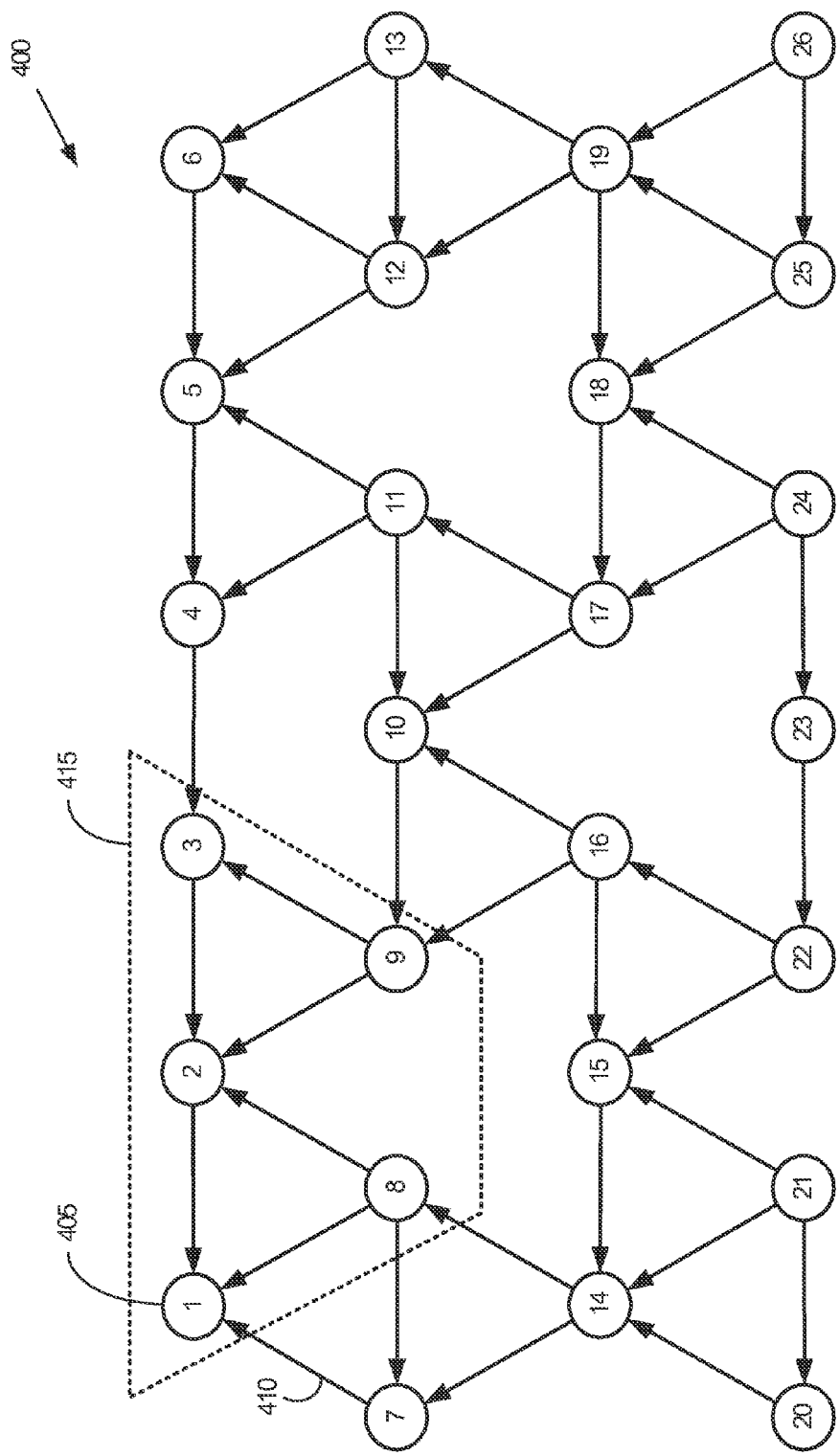
FIG. 4 is an interference graph that shows some dominant directed inter-cell interference between an ordered set of nodes after network interference cancellation according to some embodiments.

FIG. 4 is an interference graph 400 that shows directed inter-cell interference between an ordered set of nodes 405 after network interference cancellation according to some embodiments. Edges 410 indicate the inter-cell interference between the nodes 405. Edges representing the intra-cell interference have been removed in the interest of clarity, although intra-cell interference may exist in the wireless communication system represented by the interference graph 400. A decoding order for the nodes 405 is indicated by the numerals in each node 405 and network interference cancellation has been used in combination with the decoding order to cancel a portion of the inter-cell interference (and intra-cell interference) so that the edges 410 indicate the direction of the inter-cell interference, as discussed herein. The nodes 405 may be grouped into unit cells 415 (only one shown in the interest of clarity) that may overlap with each other. For example, the node 405 assigned the number 9 may be a part of the unit cell 415 and an adjacent unit cell that includes the nodes 405 assigned the numbers 9, 10, 11, 16, 17.

Interference alignment may have been used to align signals transmitted by nodes 405 in each unit cell 415 to mitigate inter-cell interference. Signals transmitted by nodes 405 may have been aligned relative to a reference direction defined by one of the nodes 405 in the unit cell 415. Some embodiments may choose the reference node 405 to be a node 405 that is in more than one unit cell 415 so that the unit cells 415 that includes the reference node 405 can be daisy-chained. The interference alignment may therefore be extended throughout the entire interference graph 400, as discussed herein.

Figure 5:
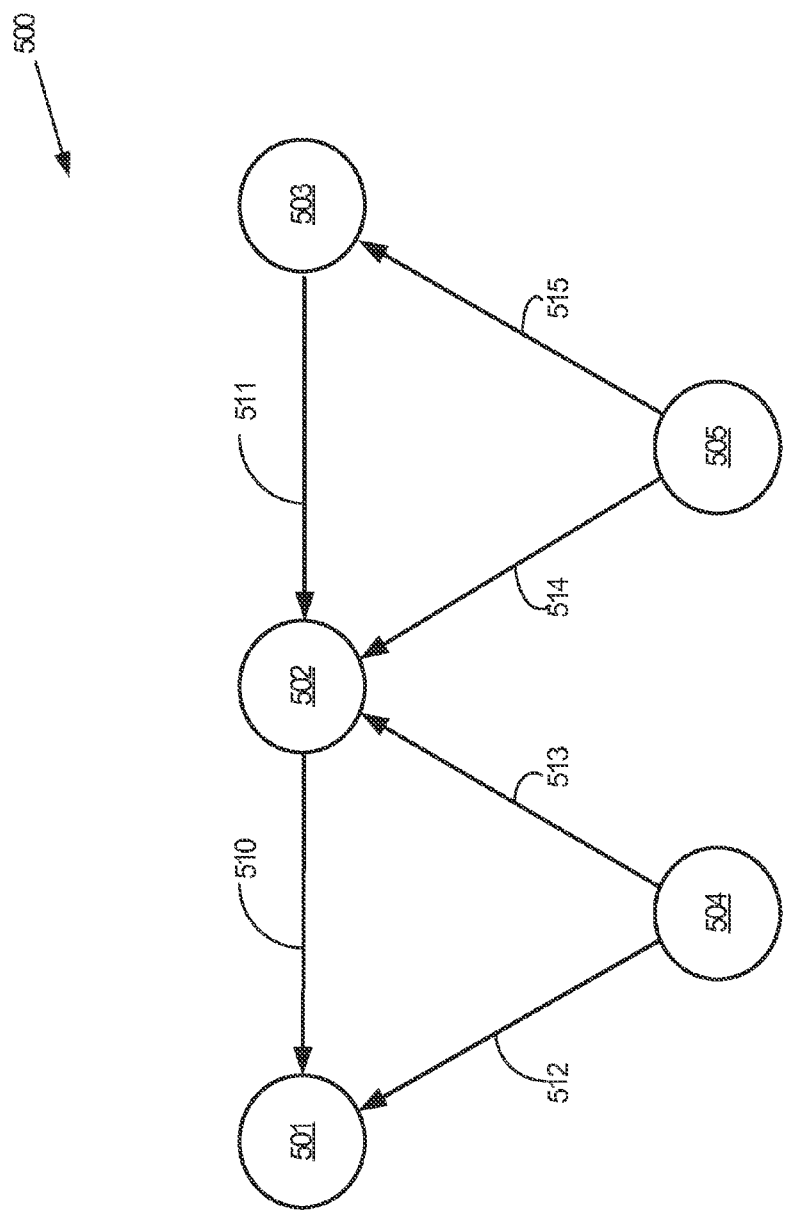
FIG. 5 is a portion of an interference diagram representing a unit cell such as the unit cell shown in FIG. 4 according to some embodiments.

FIG. 5 is a portion of an interference diagram representing a unit cell 500 such as the unit cell 415 shown in FIG. 4 according to some embodiments. The unit cell 500 includes nodes 501, 502, 503, 504, 505 (collectively referred to as "the nodes 501-505"). The reference numerals of the nodes 501-505 also indicate the decoding order used for network interference cancellation, as discussed herein. The nodes 501-505 have different degrees of inter-cell interference represented by the number of incoming interfering links indicated by the edges 510, 511, 512, 513, 514, 515 (collectively referred to as "the edges 510-515"). For example, the node 501 has an inter-cell interference degree of two and the node 502 has an inter-cell interference degree of three. Although not shown in FIG. 5 but as is clear from FIG. 4, the node 505 has an interference degree of two and the nodes 503, 504 have interference degrees of one.

Interference in the unit cell 500 may be aligned by precoding signals transmitted by the nodes 502-505 so that the two-dimensional beamforming vectors transmitted by transmitters in the nodes 502-505 occupy a single dimension at each receiver in the nodes 501-505, thereby leaving the other dimension for interference free transmission. For example, the two-dimensional beamforming vectors ($v_2$, $v_3$, $v_4$, $v_5$) may be defined so that $v_2$ represents the beamforming vector transmitted by the transmitter in the node 502, $v_3$ represents the beamforming vector transmitted by the transmitter in the node 503, etc. The signals transmitted by the node 501 do not interfere with the nodes 502-505 due to network interference cancellation. For example, the signals may be precoded to satisfy the interference alignment condition if the two-dimensional beamforming vectors ($v_2$, $v_3$, $v_4$, $v_5$) satisfy:

$$v_2 \doteq H_{12}^{-1} H_{14} v_4 \quad (1)$$

$$v_4 \doteq H_{24}^{-1} H_{25} v_5 \quad (2)$$

$$v_5 \doteq H_{25}^{-1} H_{23} v_3 \quad (3)$$

where $v \doteq u$ is shorthand for $v \in \text{span}(u)$ and $H_{ij}$ represents the channel matrix between the transmitter of the node with index j and the receiver of the node with index i. The channel matrix $H_{ij}$ may be estimated using conventional channel estimation techniques such as pilot signals, common reference signals, etc. The reference node in this example is the node 503 and the beamforming vectors ($v_2$, $v_4$, $v_5$) are therefore determined relative to the beamforming vector ($v_3$) of the node 503.

Figure 6:
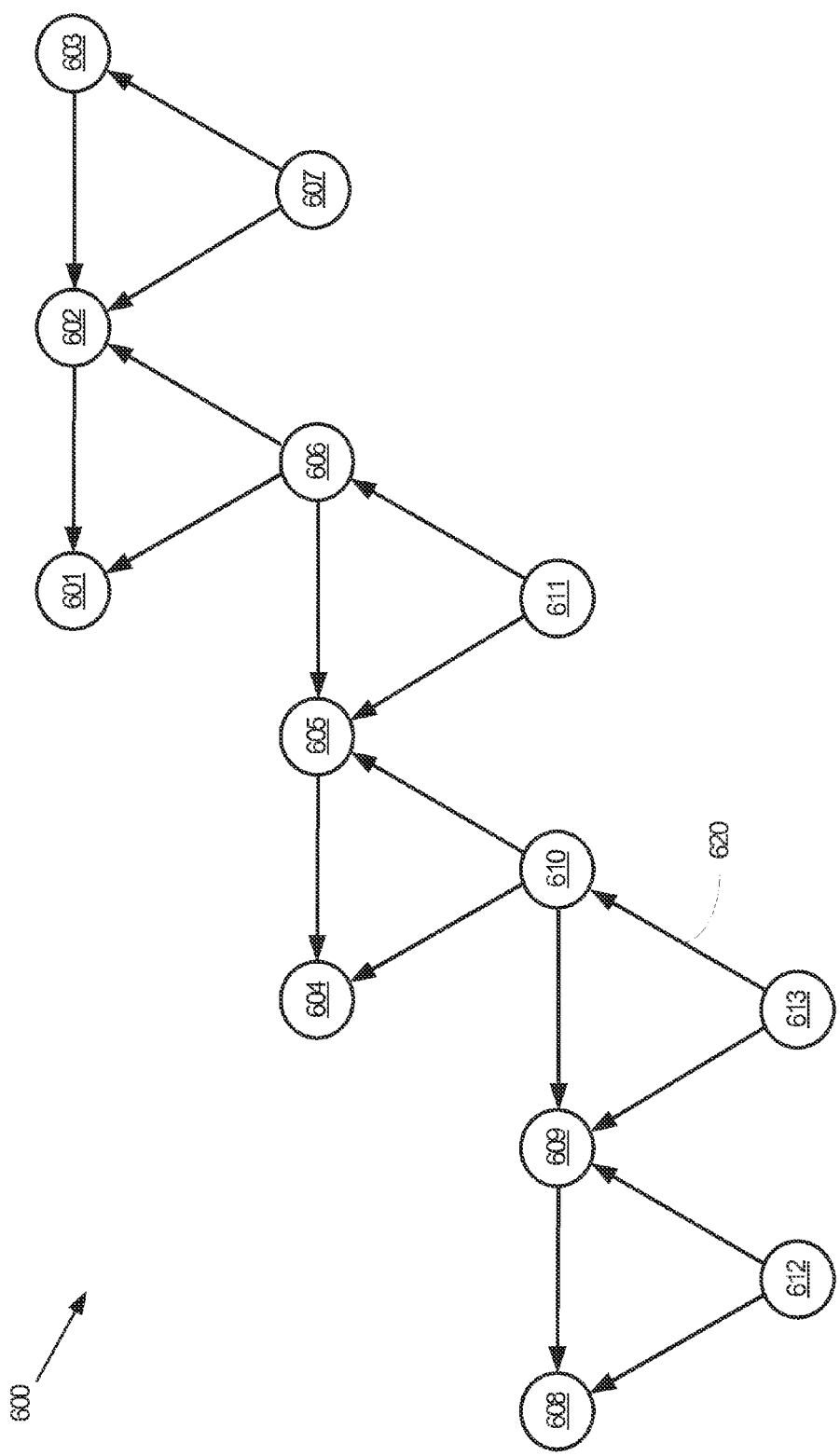
FIG. 6 is a portion of an interference diagram representing overlapping unit cells such as shown in FIG. 4 according to some embodiments.

FIG. 6 is a portion of an interference diagram 600 representing overlapping unit cells such as shown in FIG. 4 according to some embodiments. The interference diagram 600 includes a first unit cell made up of the nodes 601, 602, 603, 606, 607, a second unit cell made up of the nodes 604, 605, 606, 610, 611, and a third unit cell made up of the nodes 608, 609, 610, 612, 613. The nodes in the interference diagram 600 may be referred to collectively as "the nodes 601-613." The decoding order for the nodes 601-613 is indicated by their reference numerals. Edges 620 (only one indicated by a numeral in the interest of clarity) indicate the one directional interference between the nodes 601-613.

Nodes that are in multiple overlapping unit cells may be used to propagate the beamforming directions for interference alignment through the unit cells. For example, a beamforming vector for the node 603 may be chosen from predetermined values or may be provided by another unit cell (not shown in FIG. 6). The beamforming vectors for the nodes 601, 602, 606, 607 may then be determined relative to the beamforming vector for the node 603, e.g., using equations (1-3). The node 606 is a part of the first unit cell and the second unit cell and may therefore be selected as the reference node for the second unit cell. The beamforming vectors for the nodes 604, 605, 610, 611 may be determined relative to the beamforming vector determined for the node 606. The node 610 is a part of the second unit cell and the third unit cell and may therefore be selected as the reference node for the third unit cell. The beamforming vectors for the nodes 608, 609, 612, 613 may be determined relative to the beamforming vector determined for the node 610. This process may be repeated iteratively throughout a wireless communication network or a portion thereof.

Figure 7:
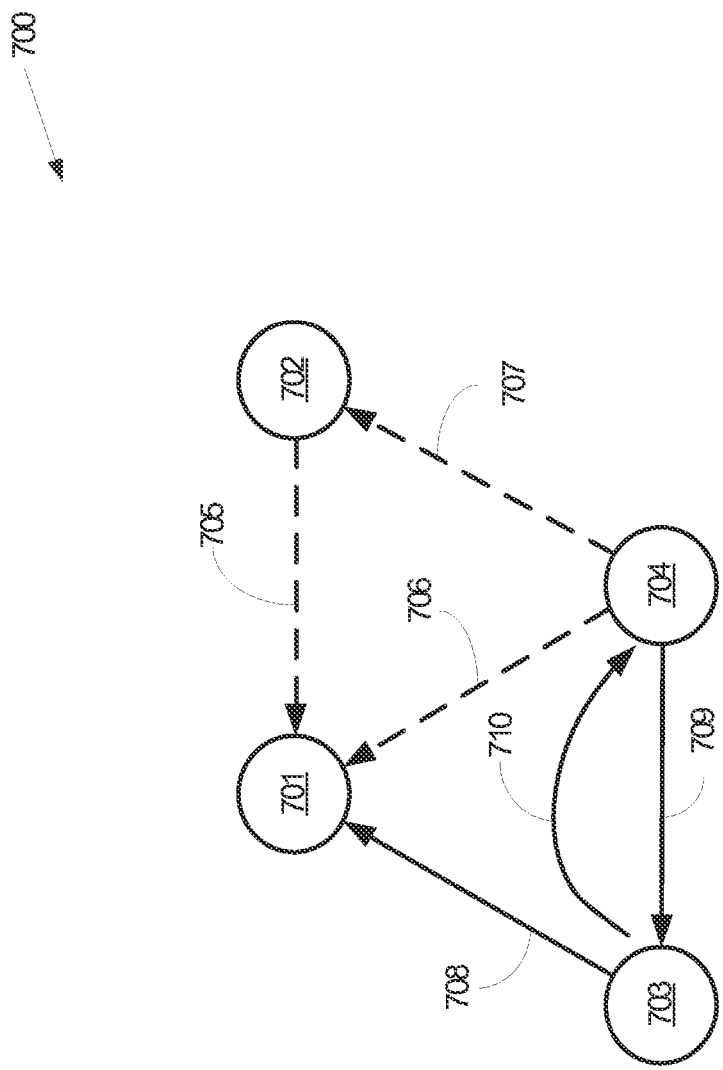
FIG. 7 is a portion of an interference diagram that illustrates intra-cell interference following network interference cancellation according to some embodiments.

FIG. 7 is a portion of an interference diagram 700 that illustrates intra-cell interference following network interference cancellation according to some embodiments. The interference diagram 700 includes nodes 701, 702, 703, 704 (collectively referred to as "the nodes 701-704") that may correspond to nodes 305 shown in FIG. 3. The decoding order of the nodes 701-704 is indicated by their reference numerals. One directional intra-cell interference is indicated by the dashed arrows 705, 706, 707 and one directional inter-cell interference is indicated by the solid arrows 708, 709. The nodes 701-704 may jointly process received signals to reduce or eliminate intra-cell interference.

Some embodiments of the transmitters and receivers in the nodes 701-704 include M=2 antennas for transmitting or receiving signals over the air interface. Each node 701-704 may then combine vector observations of received signals (i.e., observations made by the two receiving antennas of the signals transmitted by the two transmitting antennas) with values of scalar observations received from the other nodes 701-704. For example, if a receiver in the node 701 is attempting to decode a message $x_1$ received in a signal from a transmitter in the node 701, the node 701 may use scalar observations from the nodes 702, 704 to jointly process the received signals. The scalar observations for nodes 702, 704 may be respectively defined as:

$$\widehat{y_2} = u_2^T y_2 \quad (4)$$

$$\widehat{y_4} = u_4^T y_4 \quad (5)$$

where $u_i^T$ is the receive filter designed to filter (zero-force or MMSE) aligned interference components, $y_i$ is the vector of signals transmitted by the transmitter at the node indicated by the index i.

When decoding the signal is received at the receivers in the node 701, if for example, the zero-forcing filter has been used, the scalar observations of the signal at the nodes 702, 704 are given by:

$$\widehat{y_2} = h_{21}x_1 + h_{22}x_2 + h_{24}x_4 + z_2 \quad (6)$$

$$\widehat{y_4} = h_{41}x_1 + h_{42}x_2 + h_{44}x_4 + h_{34}x_3 + z_2 \quad (7)$$

where $h_{ij}$ are elements of the channel matrix between the nodes indicated by the indices i (as the receiver) and j (as the transmitter), are messages transmitted by the transmitters in the nodes indicated by the index j, and $z_j$ is noise received at the receivers in the nodes indicated by the index j. The node 701 may therefore combine its own vector observations of the received signal with the scalar observations indicated in equations 4-7 to decode the message $x_1$. For example, in the case where each transmitter and receiver has two antennas, the two vector observations in the node 701 combined with equations 6-7 form a 4-dimensional full-rank channel observation for ($x_1$, $x_2$, $x_3$, $x_4$) so that it is possible to eliminate all interference and successfully decode the message $x_1$ by jointly processing the received signals. Once the message $x_1$ has been decoded, the nodes 702, 704 can successively decode their corresponding messages $x_2$ and $x_4$. However, the node 704 may only be able to eliminate interference from the node 703 after the message $x_3$ has been decoded and the decoded message has been fed back to the node 704, as indicated by the arrow 710.

Figure 8:
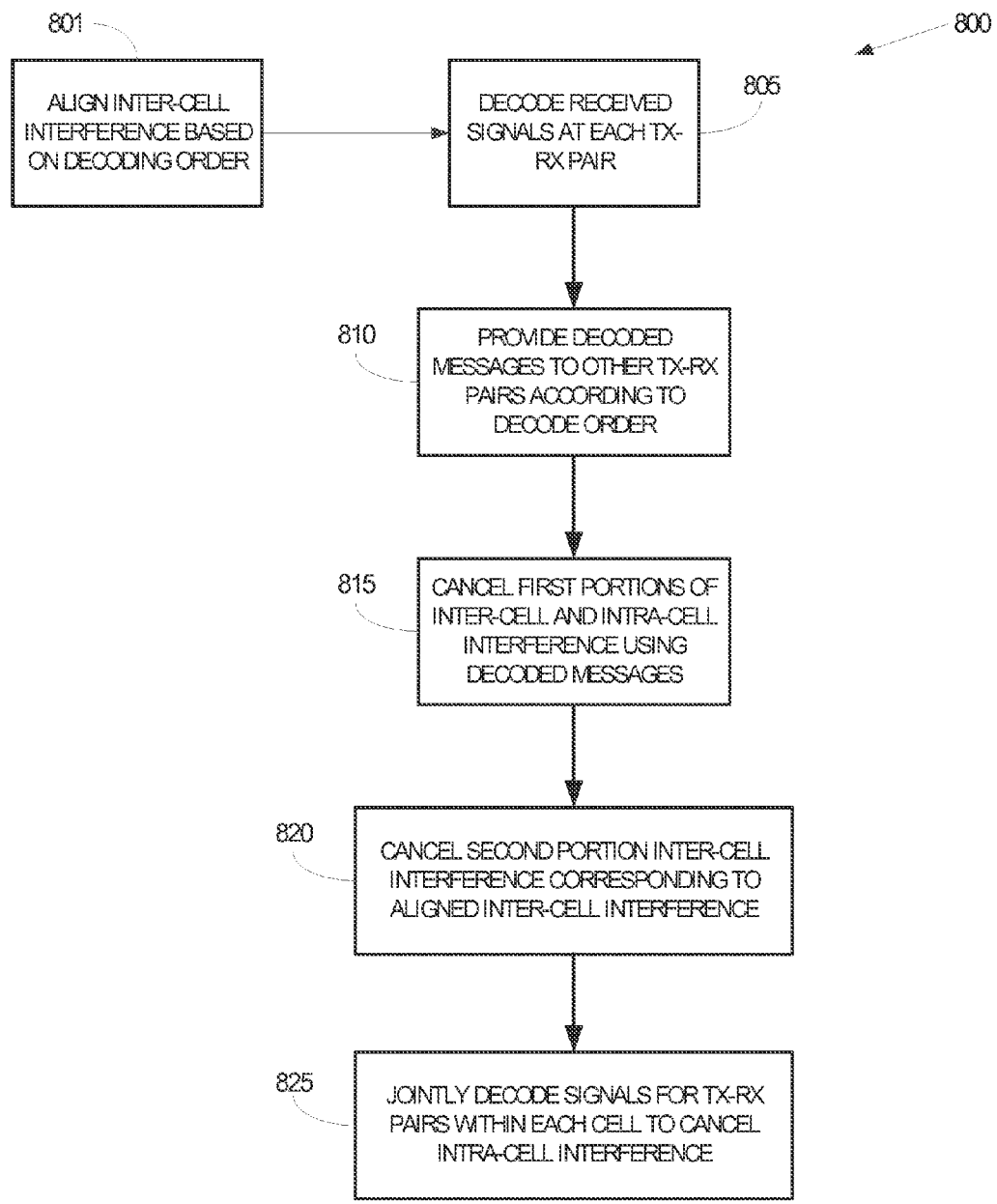
FIG. 8 is a flow diagram of a method for mitigating interference using network interference cancellation, interference alignment, and joint decoding according to some embodiments.

FIG. 8 is a flow diagram of the method 800 for mitigating interference using network interference cancellation, interference alignment, and joint decoding according to some embodiments. Embodiments of the method 800 may be implemented in various locations in a wireless communication system such as the base stations 105 or the network controller 120 shown in FIG. 1. At block 801, beamforming vectors for signals transmitted by transmitters in neighboring transmitter receiver pairs that cause intER-cell interference are aligned based on a decoding order that establishes an order or hierarchy for the transmitter receiver pairs, as discussed herein. At block 805, receivers in the transmitter receiver pairs in the wireless communication system decode received signals. At block 810, messages in the decoded signals, which may be referred to as decoded messages, are communicated between the transmitter receiver pairs according to the decoding order, as discussed herein. At block 815, first portions of inter-cell and intra-cell interference are canceled using the decoded messages. As discussed herein, the remaining inter-cell interference and intra-cell interference may therefore be reduced to a single direction between each pair of transmitter receiver pairs.

At block 820, the fact that the beamforming vectors are designed such that interference is aligned allows receivers to cancel a second portion of the inter-cell interference that corresponds to the aligned inter-cell interference. For example, inter-cell interference at a first transmitter receiver pair in a first cell can be aligned by performing interference alignment on transmitter receiver pairs that are outside of the first cell, as discussed herein. The overall contribution of aligned interference can be mitigated or canceled using receive filters that are designed to filter the aligned interference, e.g., by filtering a first subspace of the channels available to the transmitter-receiver pair while leaving a second subspace of the channels free of aligned interference so that the first transmitter-receiver pair can use the second subspace of the channels for interference-free transmission. At block 825, receivers in transmitter receiver pairs within the same cell can jointly decode signals to cancel intra-cell interference. For example, a base station in a cell may jointly decode signals received from receivers in different sectors that are served by the base station to cancel intra-cell interference.

Embodiments of the interference alignment techniques described herein may have a number of advantages over conventional practice. For example, some embodiments may achieve optimum multiplicative improvement corresponding to theoretical bounds on interference reduction without requiring impossible conditions such as infinite time-delay or infinite channel resolution. Some embodiments may achieve reductions in interference in networks with small number of transmitter-receiver links (like cellular systems) may support reuse one deployments in which each base station supports one user in each channel (time-frequency resource unit). Some embodiments may be concatenated with OFDM modulation without any restriction. Furthermore, the interference alignment techniques described herein mitigate interference both inter-cell interference and intra-cell interference coming from neighboring sectors. The overall performance of some embodiments scale accordingly when applied to larger cellular networks with increasing number of transmit-receive pairs. Some embodiments may also exploit the distributed nature of the cellular network and operate under local information exchange and can provide higher spectral-efficiency by allowing more parallel transmissions to take place within the same spectrum.

In some embodiments, certain aspects of the techniques described above may implemented by one or more processors of a processing system executing software. For example, some embodiments may be implemented in processes in the base stations 105 or the network controller 120 shown in FIG. 1. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)). The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    selecting second transmitter-receiver pairs proximate to a first transmitter-receiver pair, wherein the first transmitter-receiver pair is in a first cell and the second transmitter-receiver pairs are not in the first cell, and wherein the first and second transmitter-receiver pairs form a first group;
    canceling interference caused by signals in one direction between the first transmitter-receiver pair and the second transmitter-receiver pairs,
    in response to canceling the interference caused by the signals in one direction, aligning beamforming vectors of signals for transmission by the second transmitter-receiver pairs to be received by the first transmitter-receiver pair in a first subspace of channels defined by channel matrices between the first transmitter-receiver pair and the second transmitter-receiver pairs, wherein a second subspace of the channels is free of the signals transmitted by the second transmitter-receiver pairs; and
    aligning beamforming vectors of signals in a second group of transmitter-receiver pairs relative to at least one beamforming vector associated with at least one transmitter-receiver pair that is a member of the first group and the second group.

2. The method of claim 1, wherein canceling the interference comprises:
    decoding messages in the signals transmitted by the first transmitter-receiver pair at a first receiver and the second transmitter-receiver pairs at a second receiver; and
    providing the decoded messages for canceling interference caused by the signals in one direction between the first transmitter-receiver pair and the second transmitter-receiver pairs.

3. The method of claim 2, further comprising:
    assigning a decoding order to the first transmitter-receiver pair and the second transmitter-receiver pairs, wherein providing the decoded messages comprises providing the decoded messages to the first transmitter-receiver pair or the second transmitter-receiver pairs based on the decoding order.

4. The method of claim 3, wherein aligning signals transmitted by the second transmitter-receiver pairs comprises precoding the signals transmitted by the second transmitter-receiver pairs using estimates of channels between the first and second transmitter-receiver pairs so that the precoded signals are elements of the first subspace.

5. The method of claim 4, wherein precoding the signals comprises precoding the signals to form the beamforming vectors for the signals, wherein the beamforming vectors are defined relative to a direction of a predetermined beamforming vector used by one of the second transmitter-receiver pairs.

6. The method of claim 5, further comprising:
    jointly decoding messages in signals received by the first transmitter-receiver pair and at least one third transmitter-receiver pair, wherein said at least one third transmitter-receiver pair is in the first cell.

7. The method of claim 6, wherein jointly decoding the messages comprises exchanging scalar observations of signals received by the first transmitter-receiver pair and said at least one third transmitter-receiver pair.

8. The method of claim 7, wherein jointly decoding the messages comprises combining the scalar observations received at the first transmitter-receiver pair and said at least one third transmitter-receiver pair with vector observations of signals received by the first transmitter-receiver pair and said at least one third transmitter-receiver pair.

9. An apparatus comprising:
    a memory coupled to at least one processor;
    the at least one processor to:
        select second transmitter-receiver pairs proximate to a first transmitter-receiver pair, wherein the first transmitter-receiver pair is in a first cell and the second transmitter-receiver pairs are not in the first cell, and wherein the first and second transmitter-receiver pairs form a first group;

cancel interference caused by signals in one direction between the first transmitter-receiver pair and the second transmitter-receiver pairs, in response to cancelling the interference caused by the signals in one direction, align beamforming vectors of signals for transmission by the second transmitter-receiver pairs to be received by the first transmitter-receiver pair in a first subspace of channels defined by channel matrices between the first transmitter-receiver pair and the second transmitter-receiver pairs, wherein a second subspace of the channels is free of the signals transmitted by the second transmitter-receiver pairs, and align beamforming vectors of signals n a second group of transmitter-receiver pairs relative to at least one beamforming vector associated with at least one transmitter-receiver pair that is a member of the first group and the second group.

10. The apparatus of claim 9, wherein the processor is to:

decode messages in the signals transmitted by the first transmitter-receiver pair and the second transmitter-receiver pairs; and provide the decoded messages for canceling interference caused by the signals in one direction between the first transmitter-receiver pair and the second transmitter-receiver pairs.

11. The apparatus of claim 10, wherein the processor is to assign a decoding order to the first transmitter-receiver pair and the second transmitter-receiver pairs, and wherein the processor is to provide the decoded messages to the first transmitter-receiver pair or the second transmitter-receiver pairs based on the decoding order.

12. The apparatus of claim 11, wherein the processor is to precode the signals transmitted by the second transmitter-receiver pairs using estimates of channels between the first and second transmitter-receiver pairs so that the precoded signals are elements of the first subspace.

13. The apparatus of claim 12, wherein the processor is to precode the signals to form beamforming vectors for the signals, wherein the beamforming vectors are defined relative to a direction of a predetermined beamforming vector used by one of the second transmitter-receiver pairs.

14. The apparatus of claim 13, wherein the processor is to jointly decode messages in signals received by the first transmitter-receiver pair and at least one third transmitter-receiver pair, wherein said at least one third transmitter-receiver pair is in the first cell.

15. The apparatus of claim 14, wherein the processor is to jointly decode the messages using scalar observations of signals received by the first transmitter-receiver pair and said at least one third transmitter-receiver pair.

16. The apparatus of claim 15, wherein the processor is to combine the scalar observations received at the first transmitter-receiver pair and said at least one third transmitter-receiver pair with vector observations of signals received by the first transmitter-receiver pair and said at least one third transmitter-receiver pair.

17. A non-transitory computer readable medium embodying a set of executable instructions, the set of executable instructions to manipulate at least one processor to:

select second transmitter-receiver pairs proximate to a first transmitter-receiver pair, wherein the first transmitter-receiver pair is in a first cell and the second transmitter-receiver pairs are not in the first cell, and wherein the first and second transmitter-receiver pairs form a first group;

cancel interference caused by signals in one direction between the first transmitter-receiver pair and the second transmitter-receiver pairs;

in response to canceling the interference caused by the signals in one direction, align beamforming vectors of signals for transmission by the second transmitter-receiver pairs to be received by the first transmitter-receiver pair in a first subspace of channels defined by channel matrices between the first transmitter-receiver pair and the second transmitter-receiver pairs, wherein a second subspace of the channels is free of the signals transmitted by the second transmitter-receiver pairs, and align beamforming vectors of signals in a second group of transmitter-receiver pairs relative to at least one beamforming vector associated with at least one transmitter-receiver pair that is a member of the first group and the second group.

18. The non-transitory computer readable medium set forth in claim 17, comprising a set of executable instructions to manipulate said at least one processor to jointly decode messages in signals received by the first transmitter-receiver pair and at least one third transmitter-receiver pair, wherein said at least one third transmitter-receiver pair is in the first cell.

* * * * *